United States Patent
Bauer

(10) Patent No.: US 7,474,748 B2
(45) Date of Patent: Jan. 6, 2009

(54) MODULAR INVERSION THAT IS PROTECTED AGAINST ESPIONAGE

(75) Inventor: Sven Bauer, München (DE)

(73) Assignee: Giesecke & Devrient GmbH, Munich (DE)

( * ) Notice: Subject to any disclaimer, the term of this patent is extended or adjusted under 35 U.S.C. 154(b) by 696 days.

(21) Appl. No.: 10/514,579

(22) PCT Filed: May 13, 2003

(86) PCT No.: PCT/EP03/05011

§ 371 (c)(1),
(2), (4) Date: Nov. 15, 2004

(87) PCT Pub. No.: WO03/098429

PCT Pub. Date: Nov. 27, 2003

(65) Prior Publication Data

US 2005/0157870 A1    Jul. 21, 2005

(30) Foreign Application Priority Data

May 16, 2002  (DE)  ............................... 102 22 212

(51) Int. Cl.
*H04L 9/00* (2006.01)
*H04L 9/32* (2006.01)
(52) U.S. Cl. .............................. 380/28; 380/30; 380/44; 713/189; 713/192
(58) Field of Classification Search ............. 380/28–30, 380/44; 713/189, 192, 193, 194; 708/490–492
See application file for complete search history.

(56) References Cited

U.S. PATENT DOCUMENTS 4,405,829 A    9/1983    Rivest et al.

(Continued)

FOREIGN PATENT DOCUMENTS

DE    100 61 697    12/2000

(Continued)

OTHER PUBLICATIONS

Abstract of Japanese Patent Publication No. 10-214262, Pub. Date: Aug. 11, 1998, Patent Abstracts of Japan.

(Continued)

*Primary Examiner*—Hosuk Song
(74) *Attorney, Agent, or Firm*—Martine Penilla & Gencarella, LLP

(57) ABSTRACT

In methods for determining, in a way that is protected against spying, the modular inverse b of a value a in relation to a module n for a cryptographic application, an auxiliary value $\beta$ and an auxiliary module $\delta$ are determined at least depending on the value a, the module n and at least one masking parameter r, an auxiliary inverse $\beta'$ is determined as the modular inverse of the auxiliary value $\beta$ in relation to the auxiliary module $\delta$, and the modular inverse b is determined at least depending on the auxiliary inverse $\beta'$, the at least one masking parameter r, and the auxiliary value $\beta$ and/or the auxiliary module $\delta$. A computer program product and a portable data carrier have corresponding features. The invention provides a method for modular inversion, secured against spying, which is suitable for applications where security is critical, such as, e.g. cryptographic calculations on a portable data carrier.

31 Claims, 1 Drawing Sheet

U.S. PATENT DOCUMENTS

| | | | |
|---|---|---|---|
| 7,080,109 B2 * | 7/2006 | Koc et al. | 708/491 |
| 7,080,110 B2 * | 7/2006 | Chen et al. | 708/491 |
| 2001/0002486 A1 | 5/2001 | Kocher et al. | |

FOREIGN PATENT DOCUMENTS

| | | |
|---|---|---|
| DE | 101 43 728 | 9/2001 |
| JP | 10-214262 | 8/1998 |
| WO | WO 00/42733 | 7/2000 |
| WO | WO 01/31436 | 5/2001 |

OTHER PUBLICATIONS

D.E. Knuth et al., "The Art of Computer Programming," Addison-Wesley Pub. Co., vol. 2, 2nd Ed., (1981), pp. 320-327, 339, 340, and 606.

W. Rankl and W. Effing, "Handbuch der Chipkarten," Carl Hanser Verlag München Wien, vol. 3, (1999), pp. 482-499.

W. Rankl and W. Effing, "Smart Card Handbook," John Wiley & Sons, Ltd., 3d. Ed., (2003), pp. 524-563.

M.-L. Akkar and C. Giraud, "An Implementation of DES and AES, Secure against Some Attacks," *Proc. of the Third Int'l Workshop on Cryptographic Hardware and Embedded Systems* (2001), pp. 309-318 (XP-008002641).

\* cited by examiner

MODULAR INVERSION THAT IS PROTECTED AGAINST ESPIONAGE

BACKGROUND OF THE INVENTION

1. Field of the Invention

The invention relates in general to the technical domain of cryptography and more particularly to a technique for modular inversion provided for cryptographic purposes. The invention is provided in particular for use in portable data carriers, which can be configured e.g. as smart cards in various constructional forms or as chip modules.

2. Description of the Related Art

In the domain of cryptography methods for modular inversion are employed, for example, in generating a pair of keys for the RSA encoding or signature method described in U.S. Pat. No. 4,405,829. The RSA method uses a public key (e, m) and a secret private key d, wherein the value m is the product of two large prime numbers p and q. To calculate the key pair, firstly the values p, q and e are established. The private key d is then calculated as the modular inverse of e in relation to the module (p−1)(q−1). This means that the number d fulfils the equation 1=ed mod (p−1)(q−1). In the calculation the private key d and the module (p−1)(q−1) must remain secret.

In general for two given whole numbers a and n the modular inverse of a in relation to the module n is defined as the number b to which $0 \leq b < n$ and 1=ab mod n applies. A number b of this kind exists if a and n are relatively prime. Algorithms for calculating the modular inverse of a given value a in relation to a given module n are known per se. For example, the extended Euclidian algorithm is described on pages 325 to 327 of the book by Donald E. Knuth, "The Art of Computer Programming", Vol. 2, second edition, Addison-Wesley, 1981. A modification of the extended Euclidian algorithm particularly advantageous in connection with binary numbers is Stein's method, described on pages 321 to 324 of said book in connection with exercise 35 on page 339 and the solution to it on page 606.

In the two methods mentioned there is the problem, however, that in direct implementation of the algorithm as a program the processed program code and therefore also physical parameters such as running time or power consumption depend to a large extent on the input data. Therefore, by analysis of the power consumption curve, the program running time or other measured values conclusions can be drawn as to the input values a and n. Examples of these and other opportunities for attack in connection with portable data carriers are described in section 8.2.4.1 (pages 482 to 499) of the book "Handbuch der Chipkarten" by W. Rankl and W. Effing, third edition, Hanser, 1999. Presumably corresponding opportunities for attack are also possible in other methods for modular inversion than those described above as examples.

If at least one of the input values a or n has to be kept secret, opportunities for attack like those mentioned above pose a security risk. For instance, in the already described example of generating key pairs for the RSA method there is a danger that during calculation of the modular inversion of e in relation to the module (p−1)(q−1) an attacker will spy out either the module (p−1)(q−1) to be kept secret or directly the result of the calculation, namely the private key d.

Said security problems are particularly critical if the method for modular inversion is executed by a processor of a portable data carrier, a smart card, for example, or a chip module. A first reason for this is that portable data carriers of this kind are often used for applications where security is critical, e.g. in connection with financial transactions, access control or the signature of legally binding documents. Secondly, portable data carriers are typically in the possession of the attacker while the method is being executed, so the attacker has all the access and analysis opportunities for spying out the values to be kept secret.

SUMMARY OF THE INVENTION

An object of the invention is therefore to provide a method for modular inversion which is secured against spying and is suitable for applications where security is critical, such as, e.g., cryptographic calculations on a portable data carrier. A further object of the invention is to provide a method for modular inversion that has as low a susceptibility to attacks by running time analysis or power consumption analysis as possible.

According to the invention, the above objects are completely or partially achieved by a method for determining, in a way that is protected against spying, the modular inverse b of a value a in relation to a module n for a cryptographic application, with the steps:

a) determining an auxiliary value β and an auxiliary module δ, which are relatively prime to each other, at least depending on the value a, the module n and at least one masking parameter r in such a way that at least one of the following holds:
  the auxiliary value β differs from the value a, and
  the auxiliary module δ differs from the module n,
b) determining an auxiliary inverse β' as the modular inverse of the auxiliary value β in relation to the auxiliary module δ, and
c) determining the modular inverse b at least depending on the following values:
  the auxiliary inverse β'.
  the at least one masking parameter r, and
  at least one of the auxiliary value β and the auxiliary module δ.

Further according to the invention, the above objects are completely or partially achieved by a computer program product which has program commands to cause a processor to determine, in a way that is protected against spying, the modular inverse b of a value a in relation to a module n for a cryptographic application using processing operations that essentially correspond to the method steps listed above.

Further according to the invention, the above objects are completely or partially achieved by a portable data carrier, preferably a smart card or a chip module, which is equipped to determine, in a way that is protected against spying, the modular inverse b of a value a in relation to a module n for a cryptographic application using processing operations that essentially correspond to the method steps listed above.

The dependent claims define preferred configurations of the invention.

The invention starts from the basic idea of not feeding the input data (namely the value a and the module n) directly to a method for modular inversion, but first transforming them in a suitable way into an auxiliary value β and an auxiliary module δ. Here, at least one masking parameter r influencing the transformation is chosen, e.g. randomly or quasi-randomly or in some other suitable manner, in such a way that no sufficient information on the input data to be kept secret or the part of the input data to be kept secret can be derived even with knowledge of the auxiliary value β and/or the auxiliary module δ.

From the auxiliary value β and the auxiliary module δ an auxiliary inverse β' is then determined according to a method for modular inversion known per se. Even if this inversion method is possibly accessible to one of the initially mentioned opportunities for attack, spying out the auxiliary value β and/or the auxiliary module δ and/or the auxiliary inverse β' is of no advantage to the attacker, because they contain the initial data at least partially in masked form, namely depending on at least one masking parameter r.

Finally, the initial transformation is effectively reversed by calculating the modular inverse b depending on the auxiliary inverse β'. The at least one masking parameter r and at least one of the values β and δ and also, where appropriate, further values also have some influence on this reverse transformation.

By means of the forward and reverse transformation provided according to the invention the values to be kept secret are therefore disguised or masked before the critical calculation section. This disguising or masking is reversed again after the calculation of the modular inverse which is at risk from spying, in order to obtain the desired result. The calculations serving for masking and unmasking are secured against the opportunities for attack to be taken into account in this case. The entire method is in this way secured against spying and also suitable for critical applications. A certain extra outlay is required for the calculations serving for masking and unmasking, though overall this is not of any particular significance.

In preferred configurations both the auxiliary value β and the auxiliary module δ are masked in the sense that they differ from the basic value a and the module n, respectively. In other embodiment forms of the invention, on the other hand, it is provided to perform the masking only in respect of one of these values. Then either the auxiliary value β is identical to the value a or the auxiliary module δ is identical to the module n. These configurations can be employed in particular if one of the values a and n does not need to be kept secret.

In preferred configurations the masking parameter r is chosen again at random for each individual execution of the method, in that, for example, a suitable random number algorithm is called. In embodiment alternatives, on the other hand, the masking parameter r may remain constant for several calculations or be stepped by a simple algorithm which does not fulfil any strict requirements with regard to random distribution. This too may be sufficient to produce adequate security against spying. The masking parameter r has preferably approximately the same order of magnitude as the module n. This may mean, e.g. that the values r and n differ in length as binary or decimal numbers at the most by 20 per cent or at the most by half.

It is preferably provided to distort the value a and/or the module n by multiplying it by the masking parameter r, wherein the auxiliary value β and/or the auxiliary module δ are calculated depending on the product.

In preferred configurations, as well as the masking parameter r, at least one other auxiliary parameter s is provided, which is likewise used for calculating the masked values β and/or δ, but which is no longer directly utilised in later determining of the modular inverse. The auxiliary parameter s does, however, have an indirect influence on this calculation, because it usually influences at least one of the values β, β' and δ. The above-mentioned preferred characteristics of the masking parameter r also apply correspondingly to the auxiliary parameter s in preferred configurations.

The auxiliary value β and the auxiliary module δ result in each case as the difference between a multiple of the value a and a multiple of the module n. It can in particular be provided to determine the auxiliary value β and the auxiliary module δ according to the equations $ra=\alpha n+\beta$ and $sn=\gamma a+\delta$ or according to the equations $ra=\alpha n+\delta$ and $sn=\gamma a+\beta$. If, in addition, the in equation $0 \leq \beta < n$ or $0 \leq \delta < n$ or, respectively, the in equation $0 \leq \delta < a$ or $0 \leq \beta < a$ is fulfilled, this corresponds to one calculation of a division with remainder in each case.

The computer program product according to the invention has program commands to implement the method according to the invention. A computer program product of this kind may be, for example, a semiconductor memory or a diskette or a CD-ROM on which a calculation program according to the invention is stored. A computer program product of this kind can be provided in particular for use in the production of smart cards.

In preferred configurations the computer program product and/or the portable data carrier are further developed with features corresponding to the above-described features and/or those mentioned in the dependent method claims.

BRIEF DESCRIPTION OF THE DRAWINGS

Further features, advantages and objects of the invention are apparent from the following precise description of an embodiment example and several embodiment alternatives. Reference is made to the schematic drawings in which the (single)

DETAILED DESCRIPTION OF EXEMPLARY EMBODIMENTS

Figure 1:
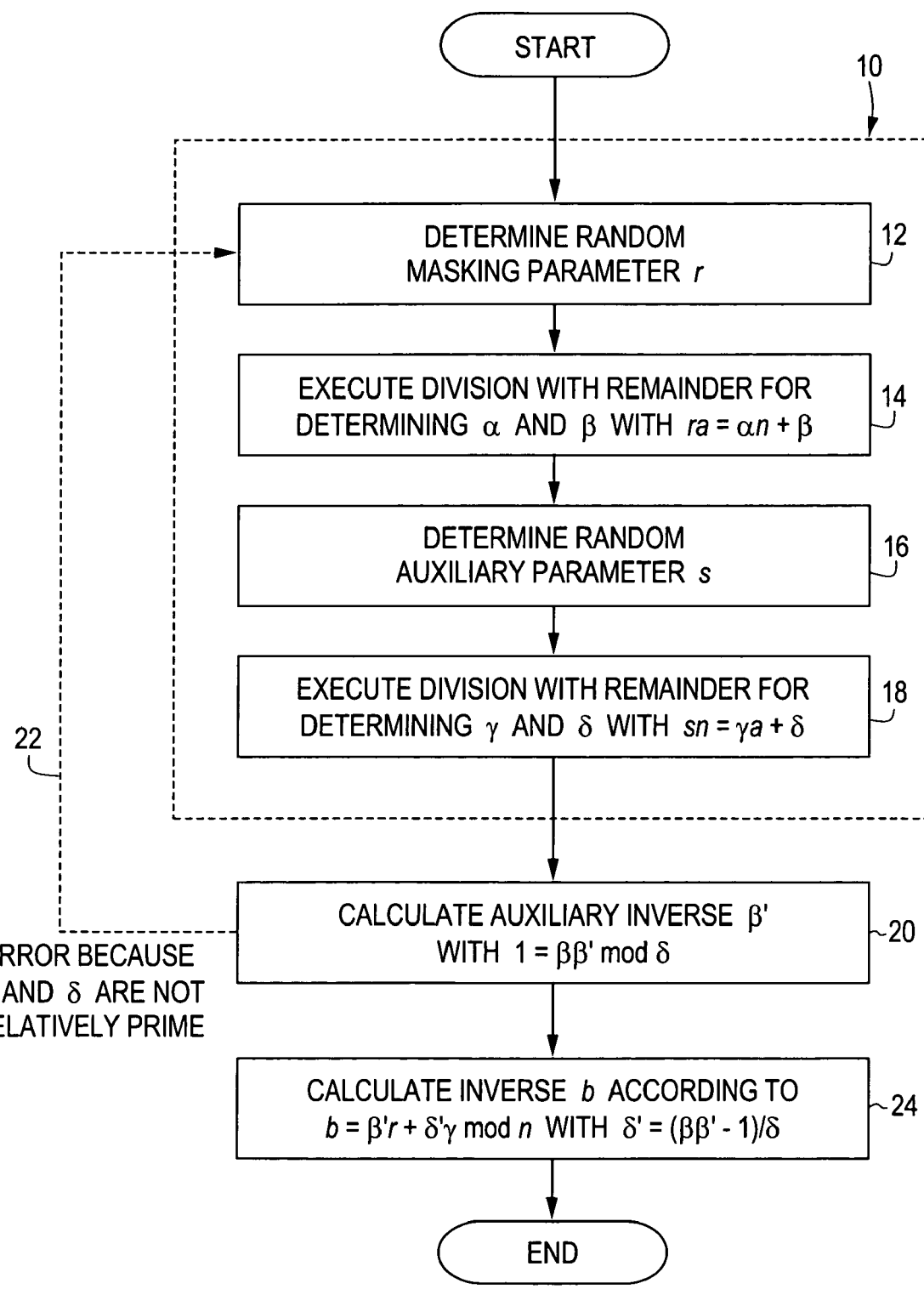
FIG. 1 shows a flow chart of the execution of the method in an embodiment example of the invention.

The method schematically illustrated in FIG. 1 is provided to be executed by a processor of a portable data carrier, in particular a smart card or a chip module. The method is for this purpose implemented in the form of program commands for this processor, stored in a ROM or EEPROM of the data carrier. In the present embodiment example the method is used in the key pair determination for an RSA encoding method or an RSA signature method. In embodiment variants of the invention, on the other hand, the method is used for other cryptographic purposes.

The method starts from a preset value a and a module n and calculates from these the modular inverse b, in other words the value $0 \leq b < n$, to which $1 = ab \mod n$ applies. In a first step 10 the value a and the module n are transformed for this, in order to determine an auxiliary value β and an auxiliary module δ. In the present embodiment example step 10 has four partial steps 12, 14, 16, 18 which can also be executed in embodiment alternatives in a different order or completely or partially interleaved.

In the first partial step 12 a random masking parameter r is determined which has approximately the same order of magnitude as the value n. A random number generator known per se and implemented by software is employed for this. The product of the masking parameter r and the value a is divided in partial step 14 by the module n into whole numbers with remainder. The whole-number quotient α is not further required, whereas the remainder β serves as auxiliary value for the further method.

Partial steps 16 and 18 correspond to partial steps 12 and 14 just described. In partial step 16 a random auxiliary parameter s is determined and in partial step 18 the product of the auxiliary parameter s with the module n is divided by the value a. Both the whole-number quotient γ and the remainder δ are required in the following steps; the remainder δ is here also designated as auxiliary module δ.

In step 20, according to a method for modular inversion known per se, for example according to the extended Euclidian algorithm or Stein's method, an auxiliary inverse β' of the auxiliary value β is calculated in relation to the auxiliary module δ. In other words the value β' has the property $1 = \beta \beta' \mod \delta$.

It can occur that the calculation of the auxiliary inverse β fails, because the values β and δ are not relatively prime and therefore no inverse β' of β exists. If this case occurs in step 20, a return 22 to the beginning of step 10 is triggered. New random values r and s are then chosen. The probability of a return of this kind taking place is approximately 40%, if a and n are relatively prime. It is therefore improbable that an excessive number of returns 22 will have to be executed. The probability of more than four new pairs of random numbers r and s having to be calculated is only approximately one per cent, for example.

If a and n are not relatively prime, the return 22 is always executed, so the method shown in FIG. 1 would not terminate. If this method were therefore to be employed in a context in which it is not certain from the start whether a and n are relatively prime, the use of a return counter is provided. The return counter monitors the number of returns 22 which occur during an execution of the method. If a preset maximum number of returns 22 is exceeded, the method of FIG. 1 is terminated. A further condition for the correct execution of the method is the exclusion of the trivial cases a=1 and n=1 (which are of no interest in practice), as in these cases the method always fails.

After determination of the auxiliary inverse β in step 20, in step 24 the inverse b is calculated, in that firstly a calculation of an intermediate value $\delta'=(\beta\beta'-1)/\delta$ and then the final calculation $b=\beta'r+\delta'\gamma$ mod n are performed. The value b is the inverse sought, which is now available to the cryptographic application.

Steps 10 and 24 can easily be secured against the initially described attacks by running time analysis and power consumption analysis, because algorithms are available for the calculations performed there which offer few opportunities for attack. Though the inverse calculation in step 20 is at risk from spying, by analyzing this step an attacker could at the most obtain knowledge about the auxiliary value β and/or the auxiliary module δ. These values were masked in step 10 in respect of the input values a and n to be kept secret, as the random masking parameter r and the random auxiliary parameter s had some influence on the calculation of β and δ. Possible knowledge of the values β and δ therefore does not allow an attacker to draw any security-damaging conclusions as to the input values a and n.

In alternative configurations of the method of FIG. 1, in partial steps 14 and 18 the roles of the values β and δ are reversed. In this case in step 24 instead of the equation $b=\beta'r+\delta'\gamma$ mod n, the equation $b=-(\delta'r+\beta'\gamma)$ mod n is used.

In further embodiment alternatives, in partial step 14 and/or partial step 16 instead of performing a division with remainder, the values α and/or γ are chosen at random or according to some other suitable method. In this case in partial step 14 the auxiliary value β results from $\beta=ra-\alpha n$ and, respectively, in partial step 18 the auxiliary module δ results from $\delta=sn-\gamma a$.

Finally, configurations of the invention are also provided in which either in partial step 12 the masking parameter r=1 and in partial step 14 the value α=0 are set (β=a then applies) or in which in partial step 16 the auxiliary parameter s=1 and in partial step 18 the value γ=0 are set (δ=n then applies). Further embodiment alternatives can be obtained in particular by combining the previously described possibilities.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for determining, in a way that is protected against spying, the modular inverse b of a value a in relation to a module n for a cryptographic application, comprising the steps:
   a) determining an auxiliary value β and an auxiliary module δ, which are relatively prime to each other, at least depending on the value a, the module n and at least one masking parameter r in such a way that at least one of the following holds:
      the auxiliary value β differs from the value a, and
      the auxiliary module δ differs from the module n,
   b) determining an auxiliary inverse β' as the modular inverse of the auxiliary value β in relation to the auxiliary module δ, and
   c) determining the modular inverse b at least depending on the following values:
      the auxiliary inverse β',
      the at least one masking parameter r, and
      at least one of the auxiliary value β and the auxiliary module δ,
   wherein the modular inverse b is used to generate a secret private key for executing an RSA method, the secret private key being stored in a portable data storage.

2. The method according to claim 1, wherein the at least one masking parameter r is randomly chosen.

3. The method according to claim 1, wherein at least one of the value a and the module n is multiplied by the masking parameter r, and wherein the thereby obtained product has some influence on the calculation of at least one of the auxiliary value β and the auxiliary module δ.

4. The method according to claim 1, wherein the determining of the auxiliary value β and the auxiliary module δ further takes place depending on at least one auxiliary parameter s, which has at the most an indirect influence on determining the inverse b.

5. The method according to claim 4, wherein the at least one auxiliary parameter s is randomly chosen.

6. The method according to claim 4 wherein the auxiliary value β and the auxiliary module δ are determined in such a way that the equations $ra=\alpha n+\beta$ and $sn=\gamma a+\delta$ are fulfilled for predetermined values α and γ.

7. The method according to claim 6, wherein the inverse b is determined by evaluating the equation $b=\beta'r+\delta'\gamma$ mod n with $\delta'=(\beta\beta'-1)/\delta$.

8. The method according to claim 4, wherein the auxiliary value β and the auxiliary module δ are determined in such a way that the equations $ra=\alpha n+\beta$ and $sn=\gamma a+\delta$ are fulfilled for values α and γ calculated in connection with the determining of the auxiliary value β and the auxiliary module δ.

9. The method according to claim 8, wherein the inverse b is determined by evaluating the equation $b=\beta'r+\delta'\gamma$ mod n with $\delta'=(\beta\beta'-1)/\delta$.

10. The method according to claim 4, wherein the auxiliary value β and the auxiliary module δ are determined in such a way that the equations $ra=\alpha n+\delta$ and $sn=\gamma a \beta$ are fulfilled for predetermined values α and γ.

11. The method according to claim 10, wherein the inverse b is determined by evaluating the equation $b=-(\delta'r+\beta'\gamma)$ mod n with $\delta'=(\beta\beta'-1)/\delta$.

12. The method according to claim 4, wherein the at least one auxiliary parameter s has the same order of magnitude as the value a.

13. The method according to claim 4, wherein the auxiliary value β and the auxiliary module δ are determined in such a way that the equations $ra=\alpha n+\delta$ and $sn=\gamma a+\beta$ are fulfilled for values α and γ calculated in connection with the determining of the auxiliary value β and the auxiliary module δ.

14. The method according to claim 13, wherein the inverse b is determined by evaluating the equation b=−(δ'r+β'γ) mod n with δ'=(ββ'−1)/δ.

15. The method according claim 4, wherein at least one of the auxiliary value β and the auxiliary module δ is determined by a division with remainder in each case, so that at least one of the inequations 0≦β<n and 0≦δ<a is fulfilled.

16. The method according to claim 1, wherein the at least one masking parameter r has the same order of magnitude as the module n.

17. The method according to claim 1, wherein the cryptographic application is a key pair determination in one of an RSA encoding method and an RSA signature method.

18. The method according to claim 1, wherein the portable data storage is one of a smart card and a chip module.

19. A computer-readable storage medium having a computer program stored thereon, the computer program including program commands to cause a processor to determine, in a way that is protected against spying, the modular inverse b of a value a in relation to a module n for a cryptographic application, the computer program causing the processor to implement functions of:
 a) determining an auxiliary value β and an auxiliary module δ, which are relatively prime to each other, at least depending on the value a, the module n and at least one masking parameter r in such a way that at least one of the following properties holds:
  the auxiliary value β differs from the value a, and
  the auxiliary module δ differs from the module n,
 b) determining an auxiliary inverse β' as the modular inverse of the auxiliary value β in relation to the auxiliary module δ, and
 c) determining the modular inverse b at least depending on the following values:
  the auxiliary inverse β',
  the at least one masking parameter r, and
  at least one of the auxiliary value β and the auxiliary module δ,
 wherein the modular inverse b is used to generate a secret private key for executing an RSA method, the secret private key being stored in a portable data storage.

20. The computer-readable storage medium according to claim 19, wherein the at least one masking parameter r is randomly chosen.

21. The computer-readable storage medium according to claim 19, wherein the at least one masking parameter r has the same order of magnitude as the module n.

22. The computer-readable storage medium according to claim 19, wherein at least one of the value a and the module n is multiplied by the masking parameter r, and wherein the thereby obtained product has some influence on the calculation of at least one of the auxiliary value β and the auxiliary module δ.

23. The computer-readable storage medium according to claim 19, wherein the determining of the auxiliary value β and the auxiliary module δ further takes place depending on at least one auxiliary parameter s, which has at the most an indirect influence on determining the inverse b.

24. The computer-readable storage medium according to claim 23, wherein the at least one auxiliary parameter s is randomly chosen.

25. The computer-readable storage medium according to claim 23, wherein the at least one auxiliary parameter s has the same order of magnitude as the value a.

26. The computer-readable storage medium according claim 23, wherein at least one of the auxiliary value β and the auxiliary module δ is determined by a division with remainder in each case, so that at least one of the inequations 0≦β<n and 0≦δ<a is fulfilled.

27. The computer-readable storage medium according to claim 19, wherein the cryptographic application is a key pair determination in one of an RSA encoding method and an RSA signature method.

28. A portable data storage which is equipped with program instructions for determining, in a way that is protected against spying, the modular inverse b of a value a in relation to a module n for a cryptographic application, the program instructions comprising:
 a) program instructions for determining an auxiliary value β and an auxiliary module δ, which are relatively prime to each other, at least depending on the value a, the module n and at least one masking parameter r in such a way that at least one of the following properties holds:
  the auxiliary value β differs from the value a, and
  the auxiliary module δ differs from the module n,
 b) program instructions for determining an auxiliary inverse β' as the modular inverse of the auxiliary value β in relation to the auxiliary module δ, and
 c) program instructions for determining the modular inverse b at least depending on the following values:
  the auxiliary inverse β',
  the at least one masking parameter r, and
  at least one of the auxiliary value β and the auxiliary module δ,
 wherein the modular inverse b is used to generate a secret private key for executing an RSA method, the secret private key being stored in the portable data storage.

29. The portable data storage according to claim 28, wherein the portable data storage is one of a smart card and a chip module.

30. The portable data storage according to claim 28, wherein the at least one masking parameter r is randomly chosen.

31. The portable data storage according to claim 28, wherein the cryptographic application is a key pair determination in one of an RSA encoding method and an RSA signature method.

* * * * *